UNITED STATES PATENT OFFICE.

SIGMUND ROZYCKI, OF SEATTLE, WASHINGTON.

SUBSTITUTE FOR FATS AS SHORTENING.

1,273,410.  Specification of Letters Patent.  Patented July 23, 1918.

No Drawing.  Application filed January 17, 1918. Serial No. 212,244.

*To all whom it may concern:*

Be it known that I, SIGMUND ROZYCKI, a citizen of the United States, and resident of the city of Seattle, county of King, and State of Washington, have invented certain new and useful Improvements in Substitutes for Fats as Shortening, of which the following is a specification.

My invention consists of a compound for use as a substitute for fats and shortening in baking. The purpose of my invention is to provide a material which will make a satisfactory substitute for the fats which are commonly used as shortening in baking, and one which will be much cheaper and which may be produced easily in large quantity.

I have discovered that a compound composed of glucose combined with a fruit or vegetable paste or butter, or compounds thereof when properly compounded, may be used as a shortening agent in substitution for the fats which are usually employed.

By the term paste or butter as used, I mean a product made by cooking the fruit or vegetable chosen until a smooth pasty product is obtained which is free from excessive water. As a generic term, this may be called vegetable butter.

The choice of materials from which to make this vegetable butter will be determined to a certain extent by their flavor, cheapness, and the manner in which they act in the combination.

The materials which I now prefer to use for the vegetable butter are apples and pumpkin. The apples furnish a pleasant flavor. They should be cooked in such a manner and to such an extent that they form a smooth pasty mass, not a watery sauce. The pumpkin should be cooked to form a mass of similar consistency. This may be effectively done by steaming and then mashing or working to secure a smooth product.

To form the compound I proportion these ingredients as follows: four parts of the apple paste or butter, four parts of the pumpkin butter and one part of glucose. These ingredients are mixed or thoroughly worked together until a homogeneous product is obtained. The above proportions are what I prefer at this time to use, but this may be varied within a reasonable range.

The quantity of the product to be used is about the same as would be taken of the usual or standard shortening materials and its treatment is the same.

I have found that by the use of this product other shortening may be dispensed with. It is, however, sometimes necessary or desirable to use a little more soda or baking powder to get the same lightness of cakes.

Cakes made in this manner retain their softness and moisture longer than cakes in which the usual shortening of a fat character has been employed. So far as flavor and physical qualities they are the equal of cakes made in which fat has been used as shortening.

The apple paste or butter may be used alone with the glucose, omitting the pumpkin. When the pumpkin is used it gives a slight coloring to the pastry and it is therefore not as desirable as other shortening for the making of white cakes.

I have found that honey may be substituted for glucose with equally good results.

What I claim as my invention is:

1. A shortening compound consisting of a fruit paste combined with glucose.

2. A shortening compound consisting of a mixture of vegetable pastes combined with glucose.

3. A shortening consisting of apple paste combined with glucose.

4. A shortening consisting of apple paste, pumpkin paste and glucose.

5. A shortening consisting of a paste composed of apples four parts, pumpkin four parts and glucose one part.

Signed at Seattle, Washington, this 8th day of January, 1918.

SIGMUND ROZYCKI.